US012701294B2

(12) United States Patent (10) Patent No.: US 12,701,294 B2
Jang (45) Date of Patent: Aug. 4, 2026

(54) METHOD AND SYSTEM FOR EXECUTING CONTROL SIGNAL LEARNING-BASED SHORTENED SERVICE

(71) Applicant: INNOPIA TECHNOLOGIES, INC., Seongnam-si (KR)

(72) Inventor: Dong-Yoon Jang, Seongnam-si (KR)

(73) Assignee: INNOPIA TECHNOLOGIES, INC., Seongnam-si (KR)

( * ) Notice: Subject to any disclaimer, the term of this patent is extended or adjusted under 35 U.S.C. 154(b) by 0 days.

(21) Appl. No.: 19/353,079

(22) Filed: Oct. 8, 2025

(65) Prior Publication Data

US 2026/0039915 A1 Feb. 5, 2026

Related U.S. Application Data

(63) Continuation of application No. PCT/KR2023/018454, filed on Nov. 16, 2023.

(30) Foreign Application Priority Data

Jul. 31, 2023 (KR) ........................ 10-2023-0099847

(51) Int. Cl.
*H04N 21/466* (2011.01)
*H04N 21/422* (2011.01)

(52) U.S. Cl.
CPC ..... *H04N 21/466* (2013.01); *H04N 21/42204* (2013.01)

(58) Field of Classification Search
CPC .......... H04N 21/466; H04N 21/42204; H04N 21/422; H04N 21/81; G06N 20/00

USPC .......................................................... 725/38
See application file for complete search history.

(56) References Cited

U.S. PATENT DOCUMENTS

| | | | | |
|---|---|---|---|---|
| 7,831,930 | B2 * | 11/2010 | Dresti ...................... | H04N 7/16 |
| | | | | 715/714 |
| 8,650,139 | B2 * | 2/2014 | Jain ...................... | G06F 16/9574 |
| | | | | 715/854 |
| 2010/0123834 | A1 * | 5/2010 | Brodersen .............. | G08C 19/28 |
| | | | | 348/734 |

FOREIGN PATENT DOCUMENTS

| | | |
|---|---|---|
| KR | 10-0703877 | 3/2007 |
| KR | 10-2009-0037954 | 4/2009 |
| KR | 10-2011-0095345 | 8/2011 |
| KR | 10-2011-0095346 | 8/2011 |
| KR | 10-2022-0136068 | 10/2022 |
| KR | 10-2592646 | 10/2023 |

OTHER PUBLICATIONS

International Search Report mailed Apr. 22, 2024, issued in corresponding International Application No. PCT/KR2023/018454, filed Nov. 16, 2023, 6 pages.

(Continued)

*Primary Examiner* — Adil Ocak
(74) *Attorney, Agent, or Firm* — CHRISTENSEN O'CONNOR JOHNSON KINDNESS PLLC

(57) ABSTRACT

Disclosed is a control signal learning-based shortened service access method and system. A control signal learning-based shortened service access system proposed herein records the control signals generated through RCU (Remote Control Unit) button clicks, and through AI-based learning or configuration of the recorded control signals, can predict frequently used services.

9 Claims, 5 Drawing Sheets

(56)                    References Cited

OTHER PUBLICATIONS

Notice of Allowance mailed Oct. 17, 2023, issued in corresponding Korean Application No. 10-2023-0099847, filed Jul. 31, 2023, 5 pages.
Office Action mailed Sep. 12, 2023, issued in corresponding Korean Application No. 10-2023-0099847, filed Jul. 31, 2023, 10 pages.

* cited by examiner

FIG. 1

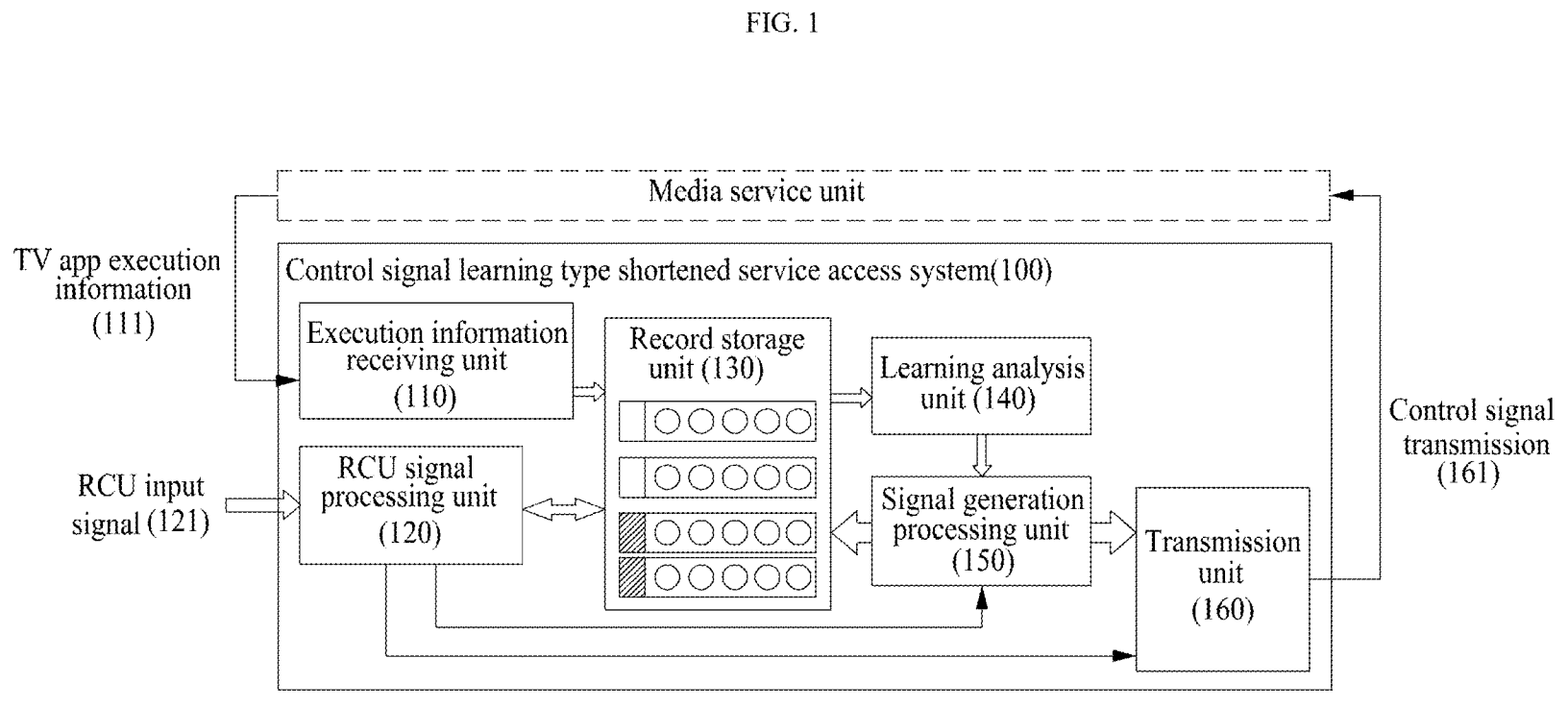

Media service unit

Control signal learning type shortened service access system(100)

TV app execution information (111)

RCU input signal (121)

Execution information receiving unit (110)

RCU signal processing unit (120)

Record storage unit (130)

Learning analysis unit (140)

Signal generation processing unit (150)

Transmission unit (160)

Control signal transmission (161)

FIG. 4

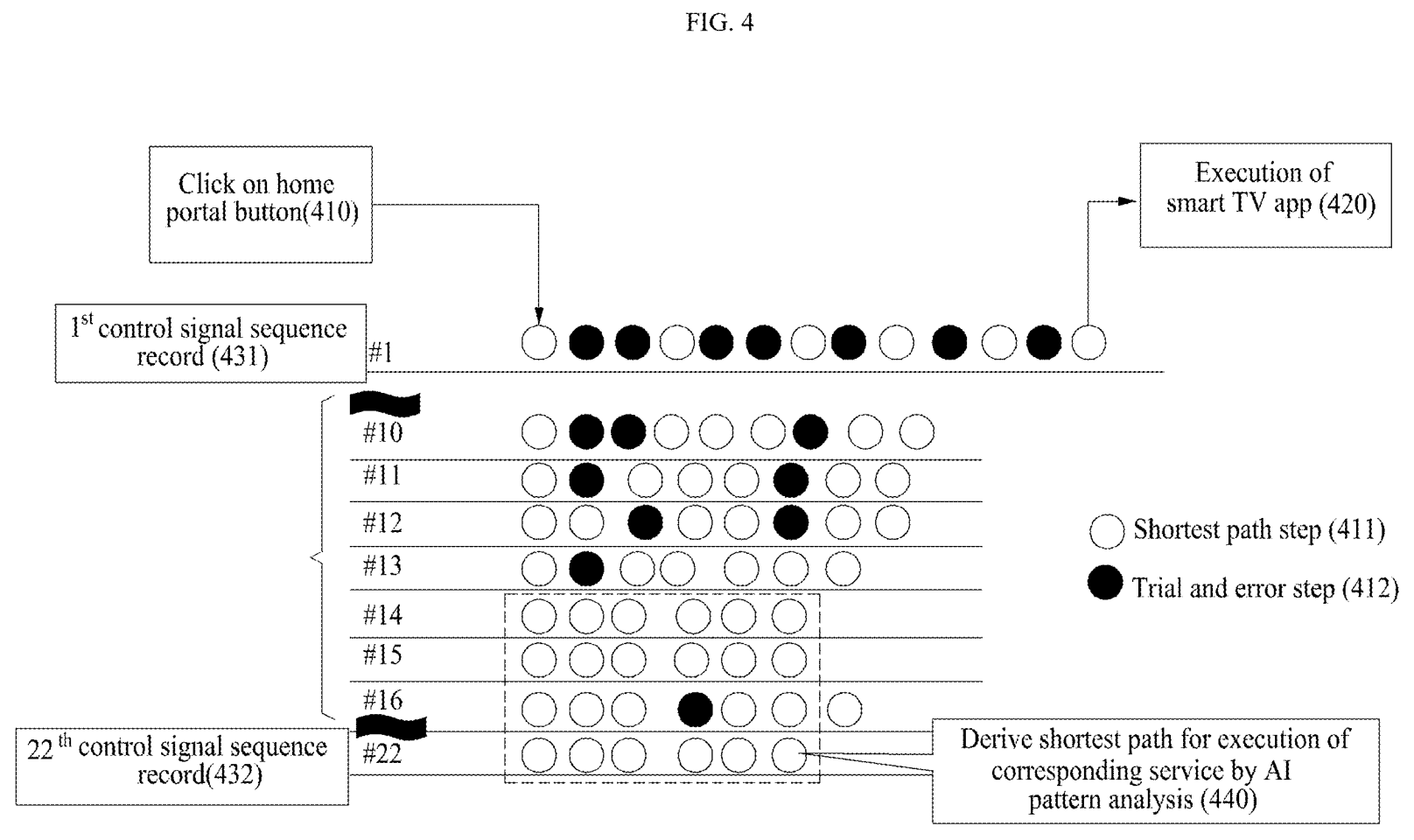

Click on home portal button(410)

Execution of smart TV app (420)

1st control signal sequence record (431)

22th control signal sequence record(432)

Shortest path step (411)

Trial and error step (412)

Derive shortest path for execution of corresponding service by AI pattern analysis (440)

Record storage unit (example of control signal sequence storage data)

| #YoutubeTV | #idle-key { | } | #↑(4) #→(3) #←(1) #OK #↓(2) ↑(1) #OK |
| :--: | :--: | :--: | :--: |
| ⋮ | | | ⋮ |
| ⋮ | | | ⋮ |

| #YoutubeTV | #idle-key { RED } | #↑(4) #→(2) #OK #↓(1) #OK |
| :--: | :--: | :--: |

METHOD AND SYSTEM FOR EXECUTING CONTROL SIGNAL LEARNING-BASED SHORTENED SERVICE

CROSS-REFERENCES TO RELATED APPLICATIONS

This U.S. non-provisional application is a continuation application of PCT International Application PCT/KR2023/018454, which has an international filing date of Nov. 16, 2023, and claims priority under 35 U.S.C. 119 to Korean Patent Application No. 10-2023-0099847, filed on Jul. 31, 2023, in the Korean intellectual property office, the disclosures of which are herein incorporated by reference in its entirety.

BACKGROUND

Field of Invention

Example embodiments relate to a method and system for executing a control signal learning-based shortened service.

Description of Related Art

An Internet protocol television (IPTV) service refers to an interactive TV service that is provided using the Internet, and is also a service that allows a user to download and view content, such as video on demand (VOD) content, through a download method or a streaming method by connecting to a content provision server operated by a content provision service provider using a set-top box connected to the Internet. The IPTV services may provide not only a VOD content service but also a broadcast program transmission service, such that the user may view various broadcast programs by changing channels.

Currently, a smart TV service including an IPTV has been providing a service interface that minimizes a complex service usage procedure by pressing a "Home" button to find a smart media service, such as VOD, Netflix, and YouTube, through a complex menu, or by providing a "Favorites" function for a frequently used service.

These services are not intuitive and rely on a service middleware/framework built inside a terminal, which makes them difficult for product manufacturers to implement independently. That is, the services may be implemented only in software frameworks of a middleware developer or a branded service provider such as Netflix.

SUMMARY

Example embodiments provide a control signal learning-based shortened service access method and system for recording a control signal itself generated through a click on a remote control unit (RCU) button and predicting a frequently used service through artificial intelligence (AI)-based learning or settings for the recorded control signal. Example embodiments automate generation and processing of sequential control signals required for access to a service through a control signal learning-based shortened service access method and system, and provide an intuitive and fast service access method.

According to an aspect, a control signal learning-based shortened service access system proposed herein includes an execution information receiving unit configured to receive app/service execution information executed through a television (TV) app or a specific menu from a media service unit; a remote control unit (RCU) signal processing unit configured to determine whether an input signal of remote control is an idle key input signal for the app/service execution information, and to transmit a signal corresponding to the input signal of remote control to a signal generation processing unit or a transmission unit based on determination results; a record storage unit configured to generate and store a dataset in which the app/service execution information and the input signal of remote control generated in the app/service execution process are combined, and to transmit the dataset to a learning analysis unit; the learning analysis unit configured to perform learning on datasets accumulated in the record storage unit, to derive a control signal sequence of a shortest path for app/service execution, and to transmit the same to the signal generation processing unit; the signal generation processing unit configured to generate a new dataset by mapping the control signal sequence received from the learning analysis unit and the idle key input signal, to store the new dataset in the record storage unit, and to transmit, to the transmission unit, the control signal sequence mapped to the idle key input signal requested by the RCU signal processing unit; and the transmission unit configured to transmit, to the media service unit, a final control signal corresponding to the control signal sequence received from the signal generation processing unit.

The RCU signal processing unit is configured to, when the input signal of remote control is the idle key input signal for the app/service execution information, search the record storage unit for prestored control signal sequence that matches the idle key input signal, and transmit the retrieved control signal sequence to the signal generation processing unit, and when the input signal of remote control is not the idle key input signal for the app/service execution information, copy and transmit the input signal of remote control to the record storage unit and, at the same time, transmit the same to the transmission unit to be delivered to the media service unit.

The record storage unit is configured to generate and store the dataset by combining the app/service execution information received from the media service unit and the input signal of remote control including a navigation key of remote control or a confirmation button click that is input for corresponding app/service execution.

The record storage unit is configured to repeatedly perform a process of generating the dataset by combining the app/service execution information received from the media service unit and the input signal of remote control including the navigation key of remote control or the confirmation button click that is input for the corresponding app/service execution, for each app/service, to accumulate and store datasets generated through the repeated performance and to transmit the accumulated datasets to the learning analysis unit to predict a shortened service for app/service execution.

The learning analysis unit is configured to use the dataset accumulated in the record storage unit, including, as control signal sequence, the input signal of remote control including the navigation key of remote control or the confirmation button click that is input for app/service execution, to since the control signal sequence includes a trial and error step for app/service execution in the input signal of remote control, perform AI-based learning for datasets accumulated in the record storage unit to derive the control signal sequence of the shortest path excluding the input signal of remote control related to the trial and error step, and to derive the control signal sequence of the shortest path for the corresponding app/service execution from the accumulated datasets for each app/service through the learning, and to transmit the derived control signal sequence of the shortest path to the signal generation processing unit.

The signal generation processing unit is configured to map the control signal sequence received from the learning analysis unit to the idle key input signal corresponding to the control signal sequence, to generate the control signal sequence mapped to the idle key input signal as a new dataset, and to store the new dataset in the record storage unit, and to when the input signal of remote control is the idle key input signal for the app/service execution information, sequentially transmit the control signal sequence mapped to the idle key input signal to the transmission unit.

The transmission unit is configured to transmit the final control signal corresponding to the control signal sequence received from the signal generation processing unit to the media service unit, or to transmit the final control signal according to the input signal of remote control received from the RCU signal processing unit to the media service unit.

According to another aspect, a control signal learning-based shortened service access method proposed herein includes receiving, through an execution information receiving unit, app/service execution information executed through a TV app or a specific menu from a media service unit; determining, through an RCU signal processing unit, whether an input signal of remote control is an idle key input signal for the app/service execution information, and transmitting a signal corresponding to the input signal of remote control to a signal generation processing unit or a transmission unit based on determination results; generating, through a record storage unit, and storing a dataset in which the app/service execution information and the input signal of remote control generated in the app/service execution process are combined, and transmitting the dataset to a learning analysis unit; performing, through the learning analysis unit, learning on datasets accumulated in the record storage unit, deriving a control signal sequence of a shortest path for app/service execution, and transmitting the same to the signal generation processing unit; generating, through the signal generation processing unit, a new dataset by mapping the control signal sequence received from the learning analysis unit and the idle key input signal, and storing the new dataset in the record storage unit; transmitting, through the signal generation processing unit to the transmission unit, the control signal sequence mapped to the idle key input signal requested by the RCU signal processing unit; and transmitting, through the transmission unit to the media service unit, a final control signal corresponding to the control signal sequence received from the signal generation processing unit.

According to example embodiments, it is possible to record a control signal itself generated through a click on an RCU button and to predict a frequently used service through AI-based learning or settings for the recorded control signal through a control signal learning-based shortened service access method and system. Also, it is possible to automate generation and processing of sequential control signals required for access to a service, and to provide an intuitive and fast service access method.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein:

FIG. 1 is a diagram illustrating a configuration of a control signal learning-based shortened service access system according to an example embodiment;

FIG. 4 illustrates a process of deriving a shortest path of app/service execution through AI pattern analysis according to an example embodiment; and FIG. 5 illustrates an example of a dataset to which an idle key and a shortest path control signal sequence for app/service execution are assigned according to an example embodiment.

DETAILED DESCRIPTION OF THE INVENTION

Figure 2:
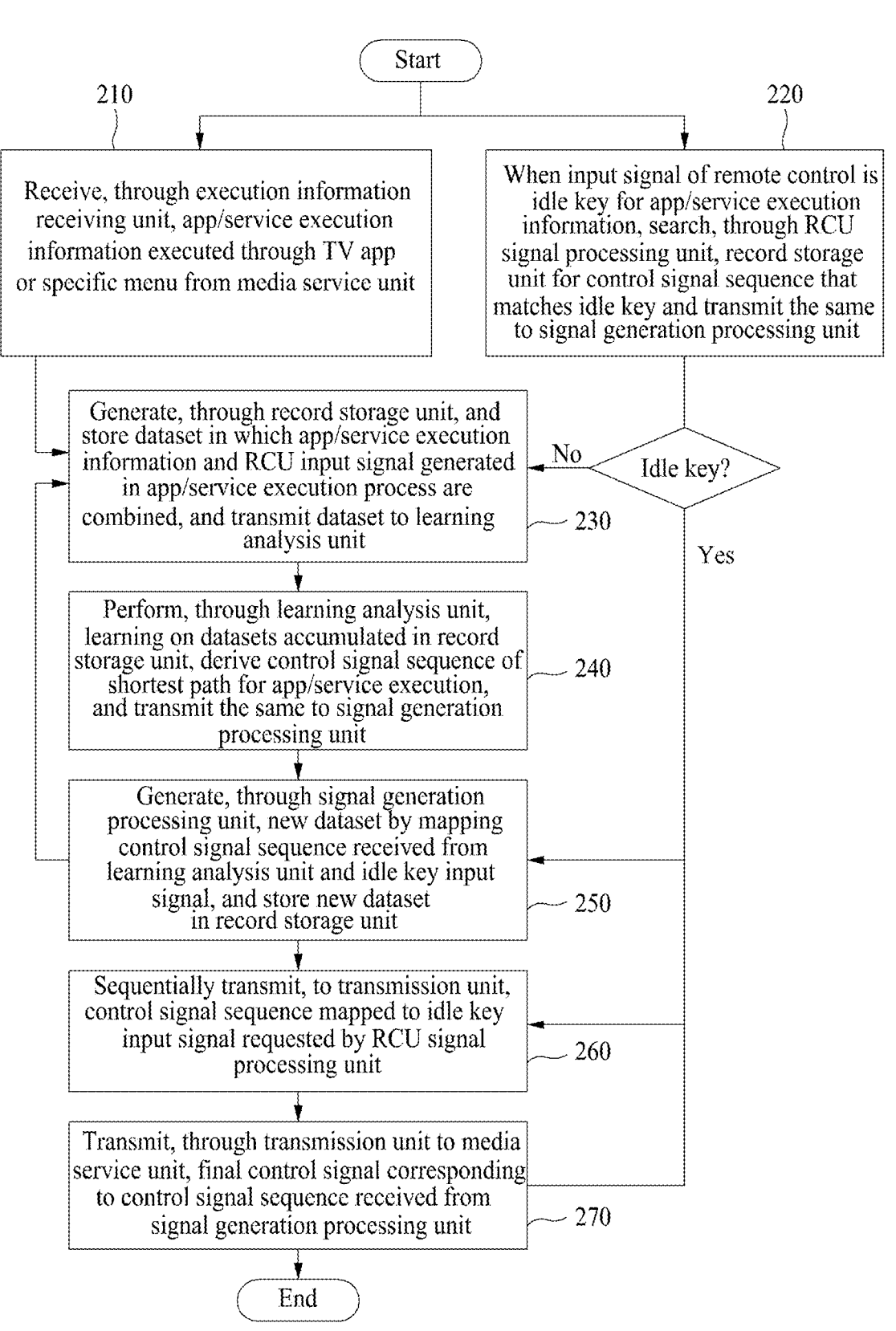
FIG. 2 is a flowchart illustrating a control signal learning-based shortened service access method according to an example embodiment.

Hereinafter, example embodiments will be described in detail with reference to the accompanying drawings.

FIG. 1 is a diagram illustrating a configuration of a control signal learning-based shortened service access system according to an example embodiment.

A control signal learning-based shortened service access system 100 according to an example embodiment includes an execution information receiving unit 110, a remote control unit (RCU) signal processing unit 120, a record storage unit 130, a learning analysis unit 140, a signal generation processing unit 150, and a transmission unit 160.

The execution information receiving unit 110 according to an example embodiment receives app/service execution information 111 executed through a TV app or a specific menu from a media service unit.

The RCU signal processing unit 120 according to an example embodiment determines whether an input signal of remote control 121 is an idle key input signal for the app/service execution information 111, and transmits a signal corresponding to the input signal of remote control 121 to the signal generation processing unit 150 or the transmission unit 160 based on determination results.

When the input signal of remote control 121 is the idle key input signal for the app/service execution information, the RCU signal processing unit 120 according to an example embodiment searches the record storage unit 130 for pre-stored control signal sequence that matches the corresponding idle key input signal, and transmits the retrieved control signal sequence to the signal generation processing unit 150.

When the input signal of remote control 121 is not the idle key input signal for the app/service execution information, the RCU signal processing unit 120 according to an example embodiment copies and transmits the input signal of remote control 121 to the record storage unit 130 and, at the same time, transmits the same to the transmission unit 160 to be delivered to the media service unit.

The record storage unit 130 according to an example embodiment generates and stores a dataset in which the app/service execution information and the input signal of remote control 121 generated in the app/service execution process are combined and transmits the dataset to the learning analysis unit 140.

The record storage unit 130 according to an example embodiment generates and stores a dataset by combining the app/service execution information received from the media service unit and the input signal of remote control 121 including a navigation key of remote control or a confirmation button click that is input for the corresponding app/service execution.

The record storage unit 130 according to an example embodiment repeatedly performs a process of generating the dataset by combining the app/service execution information received from the media service unit and the input signal of remote control 121 including the navigation key of remote control or the confirmation button click that is input for the corresponding app/service execution, for each app/service.

The record storage unit 130 according to an example embodiment accumulates and stores datasets generated through the repeated performance and transmits the accumulated datasets to the learning analysis unit 140 to predict a shortened service for app/service execution.

The learning analysis unit 140 according to an example embodiment performs learning on datasets accumulated in the record storage unit 130, derives a control signal sequence of a shortest path for app/service execution, and transmits the same to the signal generation processing unit 150.

The learning analysis unit 140 according to an example embodiment uses the dataset accumulated in the record storage unit 130, including, as control signal sequence, the input signal of remote control 121 including the navigation key of remote control or the confirmation button click that is input for app/service execution.

Since the control signal sequence includes a trial and error step for app/service execution in the input signal of remote control 121, the learning analysis unit 140 according to an example embodiment performs learning for datasets accumulated in the record storage unit 130 to derive the control signal sequence of the shortest path excluding the input signal of remote control 121 related to the trial and error step.

The learning analysis unit 140 according to an example embodiment derives the control signal sequence of the shortest path for the corresponding app/service execution from the accumulated datasets for each app/service through the learning, and transmits the derived control signal sequence of the shortest path to the signal generation processing unit 150.

The signal generation processing unit 150 according to an example embodiment generates a new dataset by mapping the control signal sequence received from the learning analysis unit 140 and the idle key input signal, stores the new dataset in the record storage unit 130, and transmits, to the transmission unit 160, the control signal sequence mapped to the idle key input signal requested by the RCU signal processing unit 120.

The signal generation processing unit 150 according to an example embodiment maps the control signal sequence received from the learning analysis unit 140 to the idle key input signal corresponding to the control signal sequence, generates the control signal sequence mapped to the idle key input signal as a new dataset, and stores the new dataset in the record storage unit 130, and when the input signal of remote control 121 is the idle key input signal for the app/service execution information, sequentially transmits the control signal sequence mapped to the idle key input signal to the transmission unit 160.

The transmission unit 160 according to an example embodiment transmits final control signals 161 corresponding to the control signal sequence received from the signal generation processing unit 150 to the media service unit.

The transmission unit 160 according to an example embodiment transmits the final control signal 161 corresponding to the control signal sequence received from the signal generation processing unit 150 to the media service unit, or transmits the final control signal according to the input signal of remote control 121 received from the RCU signal processing unit 120 to the media service unit.

FIG. 2 is a flowchart illustrating a control signal learning-based shortened service access method according to an example embodiment.

The control signal learning-based shortened service access method according to an example embodiment includes receiving, through an execution information receiving unit, app/service execution information executed through a TV app or a specific menu from a media service unit (210), determining, through an RCU signal processing unit, whether an input signal of remote control is an idle key input signal for the app/service execution information, and transmitting a signal corresponding to the input signal of remote control to a signal generation processing unit or a transmission unit based on determination results (220), generating, through a record storage unit, and storing a dataset in which the app/service execution information and the input signal of remote control generated in the app/service execution process are combined, and transmitting the dataset to a learning analysis unit (230), performing, through the learning analysis unit, learning on datasets accumulated in the record storage unit, deriving a control signal sequence of a shortest path for app/service execution, and transmitting the same to the signal generation processing unit (240), generating, through the signal generation processing unit, a new dataset by mapping the control signal sequence received from the learning analysis unit and the idle key input signal, and storing the new dataset in the record storage unit (250), transmitting, through the signal generation processing unit to the transmission unit, the control signal sequence mapped to the idle key input signal requested by the RCU signal processing unit (260), and transmitting, through the transmission unit to the media service unit, a final control signal corresponding to the control signal sequence received from the signal generation processing unit (270).

In operation 210, through the execution information receiving unit, the app/service execution information executed through the TV app or the specific menu is received from the media service unit.

In operation 220, through the RCU signal processing unit, whether the input signal of remote control is the idle key input signal for the app/service execution information is determined and a signal corresponding to the input signal of remote control is transmitted to the signal generation processing unit or the transmission unit based on determination results.

According to an example embodiment, when the input signal of remote control is the idle key input signal for the app/service execution information, prestored control signal sequence that matches the idle key input signal is retrieved from the record storage unit, and the retrieved control signal sequence is transmitted to the signal generation processing unit.

According to an example embodiment, when the input signal of remote control is not the idle key input signal for the app/service execution information, the input signal of remote control is copied and transmitted to the record storage unit and, at the same time, transmitted to the transmission unit to be delivered to the media service unit.

In operation 230, through the record storage unit, the dataset in which the app/service execution information and the input signal of remote control generated in the app/ service execution process are combined is generated and stored, and the dataset is transmitted to the learning analysis unit.

According to an example embodiment, the dataset is generated and stored by combining the app/service execution information received from the media service unit and the input signal of remote control including a navigation key of remote control or a confirmation button click that is input for the corresponding app/service execution.

According to an example embodiment, a process of generating the dataset by combining the app/service execution information received from the media service unit and the input signal of remote control including the navigation key of remote control or the confirmation button click that is input for the corresponding app/service execution, for each app/service, is repeatedly performed, and datasets generated through the repeated performance are accumulated and stored, and the accumulated datasets are transmitted to the learning analysis unit to predict a shortened service for app/service execution.

In operation 240, through the learning analysis unit, learning on datasets accumulated in the record storage unit is performed, and the control signal sequence of the shortest path for app/service execution is derived and transmitted to the signal generation processing unit.

According to an example embodiment, used is the dataset accumulated in the record storage unit, including, as control signal sequence, the input signal of remote control including the navigation key of remote control or the confirmation button click that is input for app/service execution.

According to an example embodiment, since the control signal sequence includes a trial and error step for app/service execution in the input signal of remote control, learning for datasets accumulated in the record storage unit is performed and derive the control signal sequence of the shortest path excluding the input signal of remote control related to the trial and error step.

According to an example embodiment, the control signal sequence of the shortest path for the corresponding app/service execution is derived from the accumulated datasets for each app/service through the learning, and the derived control signal sequence of the shortest path is transmitted to the signal generation processing unit.

In operation, 250, through the signal generation processing unit, the new dataset is generated by mapping the control signal sequence received from the learning analysis unit and the idle key input signal, and the new dataset is stored in the record storage unit.

According to an example embodiment, the control signal sequence received from the learning analysis unit is mapped to the idle key input signal corresponding to the control signal sequence, the control signal sequence mapped to the idle key input signal is generated as a new dataset, and the new dataset is stored in the record storage unit.

According to an example embodiment, when the input signal of remote control is the idle key input signal for the app/service execution information, the control signal sequence mapped to the idle key input signal is sequentially transmitted to the transmission unit.

In operation 260, through the signal generation processing unit, the control signal sequence mapped to the idle key input signal requested by the RCU signal processing unit is transmitted to the transmission unit.

In operation 270, through the transmission unit, the final control signal corresponding to the control signal sequence received from the signal generation processing unit is transmitted to the media service unit.

According to an example embodiment, the final control signal corresponding to the control signal sequence received from the signal generation processing unit is transmitted to the media service unit, or the final control signal according to the input signal of remote control received from the RCU signal processing unit is transmitted to the media service unit.

Figure 3:
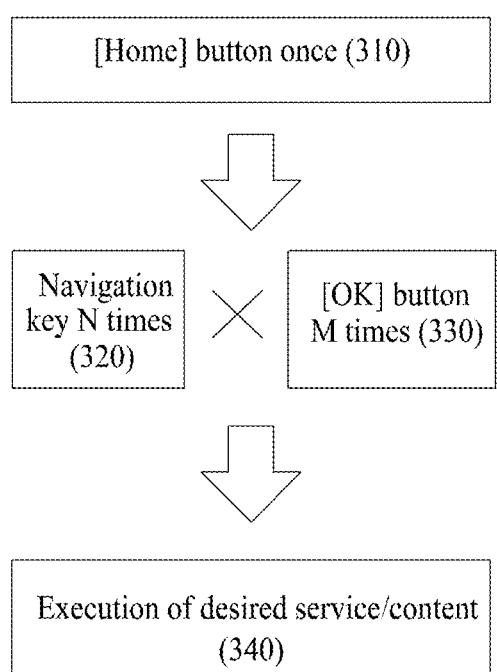
FIG. 3 illustrates an example of an app/service execution process according to an example embodiment.

FIG. 3 illustrates an example of an app/service execution process according to an example embodiment.

A smart TV service, including an IPTV, launches a smart media app/service, such as VOD, Netflix, and YouTube, by pressing a "Home" button.

According to an example embodiment, for example, a user may click on a "Home" button for app/service execution once (310), then click on a navigation key of remote control N times (320) to execute a desired app/service, and may click on an "OK" button M times (330). The user may execute the desired app/service (340) through an input signal of remote control.

Here, an execution information receiving unit according to an example embodiment receives app/service execution information desired by the user from a media service unit.

The RCU signal processing unit according to an example embodiment determines whether an input signal of remote control is an idle key input signal for the app/service execution information and, transmits a signal corresponding to the input signal of remote control to a signal generation processing unit or a transmission unit based on determination results.

When the input signal of remote control is the idle key input signal for the app/service execution information, the RCU signal processing unit according to an example embodiment searches the record storage unit for prestored control signal sequence that matches the idle key input signal, and transmits the retrieved control signal sequence to the signal generation processing unit.

When the input signal of remote control is not the idle key input signal for the app/service execution information, the RCU signal processing unit according to an example embodiment copies and transmits the input signal of remote control to the record storage unit and, at the same time, transmits the same to the transmission unit to be delivered to the media service unit.

The record storage unit according to an example embodiment generates and stores a dataset in which the app/service execution information and the input signal of remote control generated in the app/service execution process are combined, and transmits the dataset to a learning analysis unit.

The record storage unit according to an example embodiment generates and stores the dataset by combining the app/service execution information received from the media service unit and the input signal of remote control including a navigation key of remote control or a confirmation button click that is input for the corresponding app/service execution.

The record storage unit according to an example embodiment repeatedly performs a process of generating the dataset by combining the app/service execution information received from the media service unit and the input signal of remote control including the navigation key of remote control or the confirmation button click that is input for the corresponding app/service execution, for each app/service.

The record storage unit according to an example embodiment accumulates and stores datasets generated through the repeated performance and transmits the accumulated datasets to the learning analysis unit to predict a shortened service for app/service execution.

FIG. 4 illustrates a process of deriving a shortest path of app/service execution through AI pattern analysis according to an example embodiment.

For example, if the user clicks on a "Home" button (410) to execute a desired app/service (420), a dataset may be generated by combining a navigation key of remote control or a confirmation button click that is input to execute the app/service desired by the user with execution information of the corresponding app/service.

The record storage unit according to an example embodiment repeatedly performs a process of generating the dataset by combining app/service execution information received from the media service unit and the input signal of remote control including the navigation key of the remote control or the confirmation button click that is input for the corresponding app/service execution, for each app/service.

According to an example embodiment, as shown in FIG. 4, a dataset of a first control signal sequence 431 to a $22^{nd}$ control signal sequence 432 is created. Here, the dataset may include, as the control signal sequence, the input signal of remote control including the navigation key of remote control or the confirmation button click that is input for app/service execution. A trial and error step 412 for app/service execution in the input signal of remote control may be included in the control signal sequence.

The record storage unit according to an example embodiment accumulates and stores datasets generated through the repeated performance and transmits the accumulated datasets to the learning analysis unit to predict a shortened service for app/service execution.

The learning analysis unit according to an example embodiment performs learning on the datasets accumulated in the record storage unit and derives the control signal sequence of the shortest path for app/service execution (440).

The learning analysis unit according to an example embodiment uses the dataset accumulated in the record storage unit that includes, as the control signal sequence, the navigation key of remote control or the confirmation button click that is input for app/service execution.

Since the control signal sequence includes the trial and error step 412 for app/service execution in the input signal of remote control, the learning analysis unit performs learning for the datasets accumulated in the record storage unit to derive the control signal sequence of a shortest path step 411 excluding the input signal of remote control related to the trial and error step 412.

The learning analysis unit according to an example embodiment derives the control signal sequence of the shortest path for corresponding app/service execution from the accumulated datasets for each app/service through the learning (440), and transmits the derived control signal sequence of the shortest path to the signal generation processing unit.

FIG. 5 illustrates an example of a dataset to which an idle key and a shortest path control signal sequence for app/service execution are assigned according to an example embodiment.

FIG. 5 illustrates an example of a dataset generated by combining app/service execution information received from a media service unit and an input signal of remote control including a navigation key of remote control or a confirmation button click that is input for corresponding app/service execution for each app/service (e.g., Netflix, YouTube) according to an example embodiment.

The signal generation processing unit according to an example embodiment generates a new dataset by mapping the control signal sequence received from the learning analysis unit and the idle key input signal, and stores the new dataset in the record storage unit.

When the input signal of remote control is the idle key input signal for the app/service execution information, the control signal sequence mapped to the idle key input signal requested by the RCU signal processing unit is transmitted to the transmission unit.

The signal generation processing unit according to an example embodiment maps the control signal sequence received from the learning analysis unit to the idle key input signal corresponding to the control signal sequence, generates the control signal sequence mapped to the idle key input signal as a new dataset, stores the new dataset in the record storage unit, and sequentially transmits the control signal sequence mapped to the idle key input signal to the transmission unit.

The transmission unit according to an example embodiment transmits, to the media service unit, a final control signal corresponding to the control signal sequence received from the signal generation processing unit.

The transmission unit according to an example embodiment transmits the final control signal corresponding to the control signal sequence received from the signal generation processing unit to the media service unit, or transmits the final control signal according to the input signal of remote control received from the RCU signal processing unit to the media service unit.

The apparatuses described herein may be implemented using hardware components, software components, and/or the combination of the hardware components and the software components. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the example embodiments may be recorded in computer-readable media including program instructions executable through various computer methods. The computer-readable media may include, alone or in combination with program instructions, data files, data structures, and the like. The program instructions recorded in the media may be specially designed and configured for the example embodiments, or may be those known to and available in those skilled in the art of computer software. Examples of computer-readable media include magnetic media such as hard disks, floppy disks, and magnetic tapes; optical media such as CD ROM disks and DVD; magneto-optical media such as floptical disks; and hardware devices that are specially designed to store and perform program instructions, such as read-only memory (ROM), random access memory (RAM), flash memory, and the like. Examples of program instructions include machine language code, such as that produced by a compiler, as well as high-level language code that may be executed by a computer using an interpreter and the like.

Although the example embodiments are described with reference to some specific example embodiments and accompanying drawings, it will be apparent to one of ordinary skill in the art that various alterations and modifications in form and details may be made in these example embodiments without departing from the spirit and scope of the claims and their equivalents. For example, suitable results may be achieved if the described techniques are performed in different order, and/or if components in a described system, architecture, device, or circuit are combined in a different manner, and/or replaced or supplemented by other components or their equivalents.

Therefore, other implementations, other example embodiments, and equivalents of the claims are to be construed as being included in the claims.

The embodiments of the invention in which an exclusive property or privilege is claimed are defined as follows:

1. A shortened service access system comprising:
an execution information receiving unit configured to receive app/service execution information executed through a television (TV) app or a specific menu from a media service unit;
a remote control unit (RCU) signal processing unit configured to determine whether an input signal of remote control is an idle key input signal for the app/service execution information, and to transmit a signal corresponding to the input signal of remote control to a signal generation processing unit or a transmission unit based on determination results;
a record storage unit configured to generate and store a dataset in which the app/service execution information and the input signal of remote control generated in the app/service execution process are combined, and to transmit the dataset to a learning analysis unit;
the learning analysis unit configured to perform learning on datasets accumulated in the record storage unit, to derive a control signal sequence of a shortest path for app/service execution, and to transmit the same to the signal generation processing unit;
the signal generation processing unit configured to generate a new dataset by mapping the control signal sequence received from the learning analysis unit and the idle key input signal, to store the new dataset in the record storage unit, and to transmit, to the transmission unit, the control signal sequence mapped to the idle key input signal requested by the RCU signal processing unit; and the transmission unit configured to transmit, to the media service unit, a final control signal corresponding to the control signal sequence received from the signal generation processing unit,
wherein the record storage unit is configured to,
generate and store the dataset by combining the app/service execution information received from the media service unit and the input signal of remote control including a navigation key of remote control or a confirmation button click that is input for the corresponding app/service execution,
repeatedly perform a process of generating the dataset by combining the app/service execution information received from the media service unit and the input signal of remote control including the navigation key of remote control or the confirmation button click that is input for the corresponding app/service execution, for each app/service, and
accumulate and store datasets generated through the repeated performance and transmit the accumulated datasets to the learning analysis unit to predict a shortened service for app/service execution, and
the learning analysis unit is configured to,
use the dataset accumulated in the record storage unit, including, as the control signal sequence, the input signal of remote control including the navigation key of remote control or the confirmation button click that is input for app/service execution,
since the control signal sequence includes a trial and error step for app/service execution in the input signal of remote control, perform AI-based learning for datasets accumulated in the record storage unit to derive the control signal sequence of the shortest path excluding the input signal of remote control related to the trial and error step, and
derive the control signal sequence of the shortest path for the corresponding app/service execution from the accumulated datasets for each app/service through the learning, and transmit the derived control signal sequence of the shortest path to the signal generation processing unit.

2. The shortened service access system of claim 1, wherein the RCU signal processing unit is configured to,
when the input signal of remote control is the idle key input signal for the app/service execution information, search the record storage unit for prestored control signal sequence that matches the idle key input signal, and transmit the retrieved control signal sequence to the signal generation processing unit, and
when the input signal of remote control is not the idle key input signal for the app/service execution information, copy and transmit the input signal of remote control to the record storage unit and, at the same time, transmit the same to the transmission unit to be delivered to the media service unit.

3. The shortened service access system of claim 1, wherein the signal generation processing unit is configured to,
map the control signal sequence received from the learning analysis unit to the idle key input signal corresponding to the control signal sequence, generate the control signal sequence mapped to the idle key input signal as a new dataset, and store the new dataset in the record storage unit, and
when the input signal of remote control is the idle key input signal for the app/service execution information, sequentially transmit the control signal sequence mapped to the idle key input signal to the transmission unit.

4. The shortened service access system of claim 1, wherein the transmission unit is configured to transmit the final control signal corresponding to the control signal sequence received from the signal generation processing unit to the media service unit, or transmit the final control signal according to the input signal of remote control received from the RCU signal processing unit to the media service unit.

5. A shortened service access method comprising:

receiving, through an execution information receiving unit, app/service execution information executed through a television (TV) app or a specific menu from a media service unit;

determining, through a remote control unit (RCU) signal processing unit, whether an input signal of remote control is an idle key input signal for the app/service execution information, and transmitting a signal corresponding to the input signal of remote control to a signal generation processing unit or a transmission unit based on determination results;

generating, through a record storage unit, and storing a dataset in which the app/service execution information and the input signal of remote control generated in the app/service execution process are combined, and transmitting the dataset to a learning analysis unit;

performing, through the learning analysis unit, learning on datasets accumulated in the record storage unit, deriving a control signal sequence of a shortest path for app/service execution, and transmitting the same to the signal generation processing unit;

generating, through the signal generation processing unit, a new dataset by mapping the control signal sequence received from the learning analysis unit and the idle key input signal, and storing the new dataset in the record storage unit;

transmitting, through the signal generation processing unit to the transmission unit, the control signal sequence mapped to the idle key input signal requested by the RCU signal processing unit; and transmitting, through the transmission unit to the media service unit, a final control signal corresponding to the control signal sequence received from the signal generation processing unit, wherein the generating, through the record storage unit and the storing the dataset in which the app/service execution information and the input signal of remote control generated in the app/service execution process are combined, and the transmitting the dataset to the learning analysis unit comprises:

generating and storing the dataset by combining the app/service execution information received from the media service unit and the input signal of remote control including a navigation key of remote control or a confirmation button click that is input for the corresponding app/service execution;

repeatedly performing a process of generating the dataset by combining the app/service execution information received from the media service unit and the input signal of remote control including the navigation key of remote control or the confirmation button click that is input for the corresponding app/service execution, for each app/service; and accumulating and storing datasets generated through the repeated performance and transmitting the accumulated datasets to the learning analysis unit to predict a shortened service for app/service execution, and the performing, through the learning analysis unit, learning on datasets accumulated in the record storage unit, the deriving the control signal sequence of the shortest path for app/service execution, and the transmitting the same to the signal generation processing unit comprises:

using the dataset accumulated in the record storage unit, including, as control signal sequence, the input signal of remote control including the navigation key of remote control or the confirmation button click that is input for app/service execution;

since the control signal sequence includes a trial and error step for app/service execution in the input signal of remote control, performing AI-based learning for datasets accumulated in the record storage unit to derive the control signal sequence of the shortest path excluding the input signal of remote control related to the trial and error step; and deriving the control signal sequence of the shortest path for the corresponding app/service execution from the accumulated datasets for each app/service through the learning, and transmitting the derived control signal sequence of the shortest path to the signal generation processing unit.

6. The shortened service access method of claim 5, wherein the determining, through the RCU signal processing unit, whether the input signal of remote control is the idle key input signal for the app/service execution information, and the transmitting the signal corresponding to the input signal of remote control to the signal generation processing unit or the transmission unit based on determination results comprises, when the input signal of remote control is the idle key input signal for the app/service execution information, searching the record storage unit for prestored control signal sequence that matches the idle key input signal, and transmitting the retrieved control signal sequence to the signal generation processing unit.

7. The shortened service access method of claim 5, wherein the determining, through the RCU signal processing unit, whether the input signal of remote control is the idle key input signal for the app/service execution information, and transmitting the signal corresponding to the input signal of remote control to the signal generation processing unit or the transmission unit based on determination results comprises, when the input signal of remote control is not the idle key input signal for the app/service execution information, copying and transmitting the input signal of remote control to the record storage unit and, at the same time, transmitting the same to the transmission unit to be delivered to the media service unit.

8. The shortened service access method of claim 5, wherein the generating, through the signal generation processing unit, the new dataset by mapping the control signal sequence received from the learning analysis unit and the idle key input signal, and the storing the new dataset in the record storage unit comprises:

mapping the control signal sequence received from the learning analysis unit to the idle key input signal corresponding to the control signal sequence, generating the control signal sequence mapped to the idle key input signal as a new dataset, and storing the new dataset in the record storage unit; and when the input signal of remote control is the idle key input signal for the app/service execution information, sequentially transmitting the control signal sequence mapped to the idle key input signal to the transmission unit.

9. The shortened service access method of claim 5, wherein the transmitting, through the transmission unit to the media service unit, the final control signal corresponding to the control signal sequence received from the signal generation processing unit comprises transmitting the final control signal corresponding to the control signal sequence received from the signal generation processing unit to the media service unit, or transmitting the final control signal according to the input signal of remote control received from the RCU signal processing unit to the media service unit.

* * * * *